(12) United States Patent
Liang

(10) Patent No.: US 10,479,610 B2
(45) Date of Patent: Nov. 19, 2019

(54) ANTI-ROLLOVER THREE-SECTION GUIDE RAIL

(71) Applicant: Shunwei Liang, Foshan (CN)

(72) Inventor: Shunwei Liang, Foshan (CN)

( * ) Notice: Subject to any disclaimer, the term of this patent is extended or adjusted under 35 U.S.C. 154(b) by 0 days.

(21) Appl. No.: 16/359,986

(22) Filed: Mar. 20, 2019

(65) Prior Publication Data

US 2019/0291962 A1 Sep. 26, 2019

(30) Foreign Application Priority Data

Mar. 21, 2018 (CN) .................... 2018 2 0391574 U

(51) Int. Cl.
*B65G 35/06* (2006.01)
*E01B 5/02* (2006.01)

(52) U.S. Cl.
CPC ................ *B65G 35/06* (2013.01); *E01B 5/02* (2013.01)

(58) Field of Classification Search
CPC ..................................................... B65G 35/06
USPC ................................... 198/836.1, 837, 860.3
See application file for complete search history.

(56) References Cited

U.S. PATENT DOCUMENTS

| 3,581,877 | A | * | 6/1971 | Goldberg | ........... | B65G 21/2072 |
| | | | | | | 198/836.1 |
| 5,154,280 | A | * | 10/1992 | Mott | ................ | B65G 21/2081 |
| | | | | | | 198/525 |
| 5,598,784 | A | * | 2/1997 | Kubsik | ................ | B65G 21/06 |
| | | | | | | 104/111 |
| 6,098,791 | A | * | 8/2000 | Minnerop | ............... | B21B 39/14 |
| | | | | | | 198/597 |
| 6,422,153 | B1 | * | 7/2002 | Reitsch, Jr. | ............. | B60S 3/004 |
| | | | | | | 104/162 |
| 6,962,249 | B2 | * | 11/2005 | Ludwig | ................ | B65G 17/002 |
| | | | | | | 198/345.3 |
| 7,673,741 | B2 | * | 3/2010 | Nemedi | ................ | B65G 15/42 |
| | | | | | | 198/834 |
| 8,069,977 | B2 | * | 12/2011 | Avery | .................... | B65G 15/62 |
| | | | | | | 198/750.1 |
| 8,186,502 | B2 | * | 5/2012 | Mackin | .................. | B65G 15/26 |
| | | | | | | 198/313 |
| 8,490,780 | B2 | * | 7/2013 | Bell | .................... | B65G 21/2072 |
| | | | | | | 198/836.1 |
| 9,139,369 | B2 | * | 9/2015 | Williams | ............... | B65G 15/60 |
| 9,296,564 | B2 | * | 3/2016 | Kuiper | ................... | B65G 15/62 |
| 10,064,500 | B2 | * | 9/2018 | Furui | ........................ | A47F 1/12 |

* cited by examiner

*Primary Examiner* — Douglas A Hess
(74) *Attorney, Agent, or Firm* — Dragon Sun Law Firm, PC; Jinggao Li, Esq.

(57) ABSTRACT

The present disclosure provides an anti-rollover three-section guide rail including upper rail, a middle rail, a fixed rail and a first roller assembly. The middle rail is in rolling fit with the fixed rail through a second roller assembly; a first rolling slot is formed in the left side wall of the middle rail, and a second rolling slot is formed in the right side wall of the middle rail; the first roller assembly includes a first roller frame; a first roller in rolling fit with the first rolling slot is pivoted to the left side of the first roller frame, and a second roller in rolling fit with the second rolling slot is pivoted to the right side of the first roller frame; the center of the first roller is located below the center of the second roller; and the upper rail includes a rail body.

4 Claims, 2 Drawing Sheets

ANTI-ROLLOVER THREE-SECTION GUIDE RAIL

CROSS-REFERENCE TO RELATED APPLICATIONS

This application claims priority from Chinese Patent Application No. CN201820391574.X, filed Mar. 21, 2018, the content of which is incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to a guide rail, and in particular relates to an anti-rollover three-section guide rail.

BACKGROUND

Currently, a conventional anti-rollover three-section guide rail comprises an upper rail, a middle rail and a fixed rail which are sequentially in rolling fit with each other, wherein the upper rail is in rolling fit with the middle rail through rollers pivoted to two sides of the upper rail. However, in actual application, because stress is concentrated to one side of the upper rail, the upper rail inclines towards the side, and the force of the roller on the side of the upper rail applied to the middle rail is greater than the force of the roller on the other side of the upper rail applied to the middle rail, i.e., one side of the middle rail has larger wear, and the service life of the anti-rollover three-section guide rail is further affected.

Therefore, an unaddressed need exists in the art to address the aforementioned deficiencies and inadequacies.

SUMMARY

In order to overcome the defects existing in the prior art, the present disclosure aims at providing an anti-rollover three-section guide rail which can prevent the upper rail from rollover, and stress on the upper rail can equally act on the middle rail through the first roller and the second roller, so that friction forces on two sides of the middle rail are the same, and the service life is further prolonged.

The purpose of the present disclosure is realized through the following technical scheme:

the anti-rollover three-section guide rail comprises an upper rail, a middle rail;

a fixed rail, a first roller assembly and a second roller assembly, wherein the middle rail is in rolling fit with the fixed rail through the second roller assembly; a first rolling slot is concavely formed in the left side wall of the middle rail;

and a second rolling slot is concavely formed in the right side wall of the middle rail;

the first roller assembly comprises a first roller frame;

the first roller frame is in an inverted U shape and covers the middle rail;

a first roller is pivoted to the left side of the first roller frame; and the first roller is inserted into and in rolling fit with the first rolling slot;

a second roller is pivoted to the right side of the first roller frame; and the second roller is inserted into and in rolling fit with the second rolling slot;

the center of the first roller is located below the center of the second roller;

the upper rail comprises an inverted U-shaped rail body; and the inverted U-shaped rail body covers the first roller assembly;

the left side of the inverted U-shaped rail body extends inwards to form a first supporting plate; and the first supporting plate carries the first roller and is in rolling fit with the first roller; and the right side of the inverted U-shaped rail body extends inwards to form a second supporting plate, and the second supporting plate carries the second roller and is in rolling fit with the second roller.

Further, a third roller is pivoted to the top wall of the first roller frame; and is in rolling fit with the upper rail and the middle rail.

Further, two first limiting structures which are respectively arranged at the front end and the rear end of the first roller frame are arranged on the middle rail; and the distance between the two first limiting structures is greater than the length of the first roller frame, so that the first limiting structures are used for abutting against the first roller frame.

Further, second limiting structures are respectively arranged at the front end and the rear end of the upper rail, and are used for abutting against the first roller frame.

Further, the fixed rail comprises a top plate and a bottom plate which are arranged in an up and down manner at intervals; and a first connecting plate for connecting the right side of the top plate with the right side of the bottom plate;

the second roller assembly comprises a second roller frame, wherein the second roller frame comprises a first mounting plate and a second mounting plate which are respectively arranged at the upper end and the lower end of the top plate, and a second connecting plate and a third connecting plate which are respectively arranged on the left side and the right side of the first connecting plate;

the second connecting plate is used for connecting the left side of the first mounting plate with the left side of the second mounting plate; and the third connecting plate is fixed to the right side of the first connecting plate;

a fourth roller in rolling fit with the top plate and the middle rail is pivoted to the first mounting plate;

a fifth roller in rolling fit with the top plate is pivoted to the second mounting plate; and a sixth roller in rolling fit with the first connecting plate and the middle rail is pivoted to the third connecting plate.

Further, two third limiting structures which are respectively arranged at the front end and the rear end of the second roller frame are arranged on the middle rail and the top plate, and the third limiting structures are used for abutting against the second roller frame.

Compared with the prior art, the anti-rollover three-section guide rail provided by the present disclosure has the beneficial effects that:

when being concentrated to the right side of the upper rail, the stress acts on the first roller through the first supporting plate, and the slot wall of the first rolling slot abuts against the first roller to prevent the first roller frame from rolling over; and the center of the first roller is located below the center of the second roller, so that the interlocking force of the first roller assembly to the middle rail can be improved compared with a manner that the first roller and the second roller are symmetrically arranged, and the first roller can be further prevented from rolling over. At this time, the first roller assembly and the upper rail can keep balanced; the stress on the upper rail can equally act on the middle rail through the first roller and the second roller, so that friction forces on two sides of the middle rail are equal, and further the service life is prolonged.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
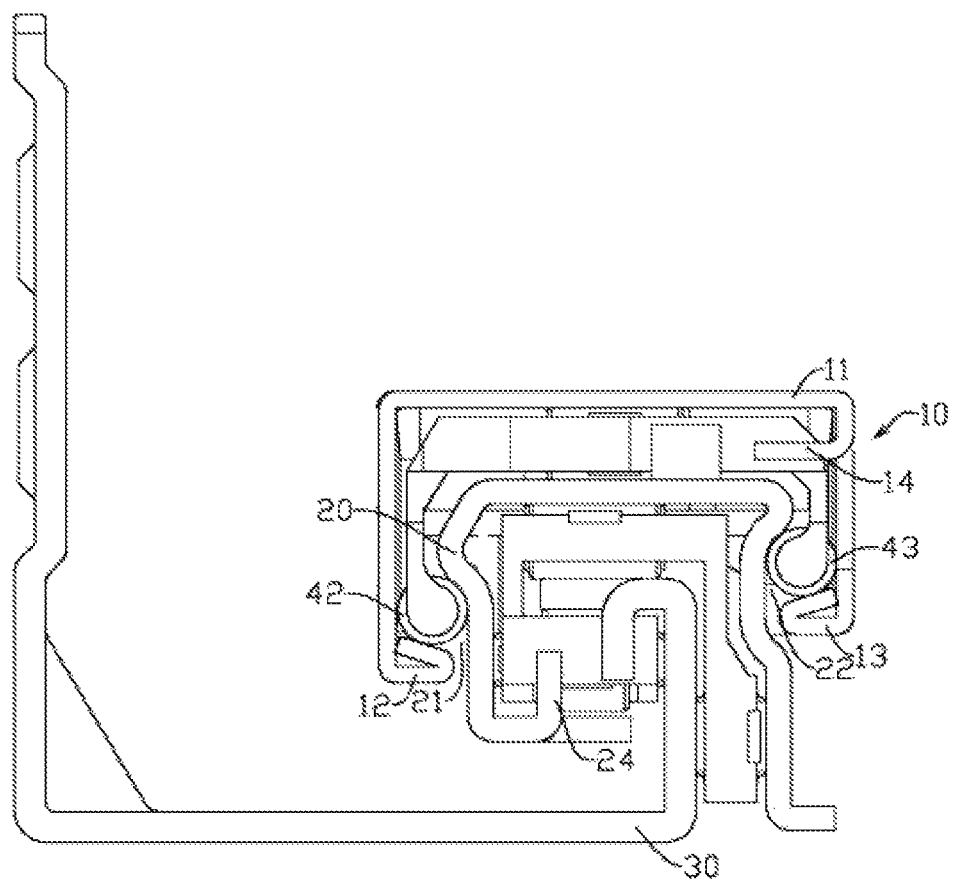
FIG. 1 is a front view of an anti-rollover three-section guide rail of the disclosure.

In the drawings: 10—Upper rail; 11—Rail body; 12—First supporting plate; 13—Second supporting plate; 14—Second limiting structure; 20—Middle rail; 21—First rolling slot; 22—Second rolling slot; 23—First limiting structure; 24—Third limiting structure; 30—Fixed rail; 31—Top plate; 32—Bottom plate; 33—First connecting plate; 40—First roller assembly; 41—First roller frame; 42—First roller; 43—Second roller; 44—Third roller; 50—Second roller assembly; 51—First mounting plate; 52—Second mounting plate; 53—Second connecting plate; 54—Third connecting plate.

DETAILED DESCRIPTION

The present disclosure is further described hereinafter in combination with accompanying drawings and specific embodiments. It should be noted that any combination of embodiments or technical features described below can form a new embodiment under the premise of no conflict.

Figure 2:
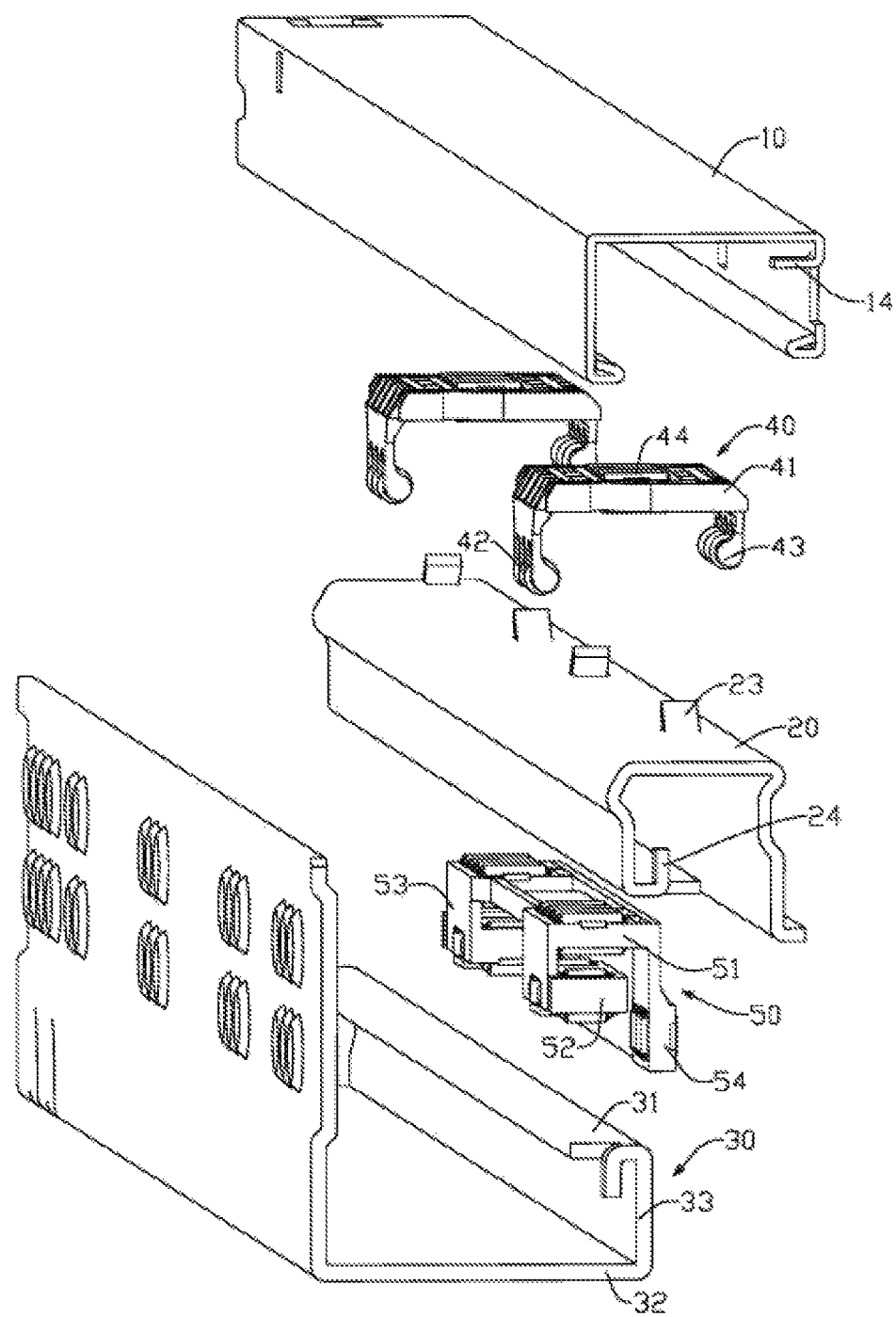
FIG. 2 is a split structure schematic diagram of the anti-rollover three-section guide rail of the disclosure.

As shown in FIGS. 1-2, an anti-rollover three-section guide rail comprises an upper rail 10, a middle rail 20, a fixed rail 30, a first roller assembly 40 and a second roller assembly 50, wherein the middle rail 20 is in rolling fit with the fixed rail 30 through the second roller assembly 50; the first rolling slot 21 is concavely formed in the left side wall of the middle rail 20, and the second rolling slot 22 is concavely formed in the right side wall of the middle rail 20; the first roller assembly 40 comprises a first roller frame 41; the first roller frame 41 is in an inverted U shape and covers the first roller 42; a first roller 42 is pivoted to the left side of the first roller frame 41, and the first roller 42 is inserted into and in rolling fit with the first rolling slot 21; a second roller 43 is pivoted to the right side of the first roller frame 41, and the second roller 43 is inserted into and in rolling fit with the second rolling slot 22; the center of the first roller 42 is located below the center of the second roller 43; the upper rail 10 comprises an inverted U-shaped rail body 11, and the inverted U-shaped rail body 11 covers the first roller assembly 40; the left side of the inverted U-shaped rail body 11 extends inwards to form a first supporting plate 12, and the first supporting plate 12 carries the first roller 42 and is in rolling fit with the first roller 42; and the right side of the inverted U-shaped rail body 11 extends inwards to form a second supporting plate 13, and the second supporting plate 13 carries the second roller 43 and is in rolling fit with the second roller 43.

Based on the above structure, when the anti-rollover three-section guide rail is used and the stress is concentrated on the right side of the upper rail 10, the stress acts on the first roller 42 through the first supporting plate 12. At the moment, the upper slot wall of the first rolling slot 21 acts on the first roller 42 to prevent the first roller 42 from moving upwards, so that the first roller frame 41 and the upper rail 10 are prevented from rolling over. Besides, the center of the first roller 42 is located below the center of the second roller 43, according to the mechanics principle, it can be known that such arrangement can increase the contact area between the first roller 42 and the middle rail 20 in comparison with the symmetrical arrangement mode of the first roller 42 and the second roller 43, and the interlocking force of the first roller assembly 40 to the middle rail 20 is increased, so that the first roller assembly 40 and the upper rail 10 are further prevented from rolling over. In other words, the stress on the upper rail 10 can equally act on the middle rail 20 through the first roller 42 and the second roller 43, so friction forces on two opposite sides of the middle rail 20 are equalized, i.e. wear at two opposite sides of the middle rail 20 is equalized, and the service life of the anti-rollover three-section guide rail is further prolonged.

In order to increase the movement smoothness of the upper rail 10, preferably, a third roller 44 is pivoted at the top wall of the first roller frame 41, and the third roller 44 is in rolling fit with the upper rail 10 and the middle rail 20.

In order to prevent the first roller assembly 40 from being separated from the middle rail 20, preferably, two first limiting structures 23 are respectively arranged at the front end and the rear end of the first roller frame 41, and two first limiting structures 23 are arranged on the middle rail 20, and the distance between the two first limiting structures 23 is greater than the length of the first roller frame 41, so that the first roller frame 41 has a certain movement space; and the first limiting structures 23 are used for abutting against the first roller frame 41. The abutment between the first limiting structures 23 and the first roller frame 41 restricts the first roller frame 41 from being separated from the middle rail 20.

In order to prevent the upper rail 10 from being separated from the middle rail 20. More preferably, second limiting structures 14 are respectively arranged at the front end and the rear end of the upper rail 10, and the second limiting structures 14 are used for abutting against the first roller frame 41.

Specifically, the fixed rail 30 comprises a top plate 31 and a bottom plate 32 which are arranged in the up and down manner at intervals, and a first connecting plate 33 for connecting the right side of the top plate 31 with the right side of the bottom plate 32; the second roller assembly 50 comprises a second roller frame; the second roller frame comprises a first mounting plate 51 and a second mounting plate 52 which are respectively arranged at the upper end and the lower end of the top plate 31, and a second connecting plate 53 and a third connecting plate 54 which are respectively arranged on the left side and the right side of the first connecting plate 33; the second connecting plate 53 is used for connecting the left side of the first mounting plate 51 with the left side of the second mounting plate 52, and the third connecting plate 54 is fixed to the right side of the first connecting plate 33; a fourth roller in rolling fit with the top plate 31 and the middle rail 20 is pivoted to the first mounting plate 51; a fifth roller in rolling fit with the top plate 31 is pivoted to the second mounting plate 52; and a sixth roller in rolling fit with the first connecting plate 33 and the middle rail 20 is pivoted on the third connecting plate 54. In the above structure, the first mounting plate 51 and the second mounting plate 52 are respectively arranged on the upper side and the lower side of the top plate 31, so that the first mounting plate 51 and the second mounting plate 52 can clamp the top plate 31 through the fourth roller and the fifth roller, so that the second roller frame can be stably mounted. Besides, through cooperation with the fourth roller, the fifth roller and the sixth roller, the movement smoothness of the middle rail 20 can be increased.

In order to prevent the middle rail 20 from being separated from the frame of the third roller 44, preferably, two third limiting structures 24 which are respectively arranged at the front end and the rear end of the second roller frame are arranged on the middle rail 20 and the top plate 31, and the third limiting structures 24 are used for abutting against the second roller frame.

The above embodiments are only preferred embodiments of the present disclosure and are not intended to limit the scope of protection of the disclosure. Any non-material alteration and substitution made by those skilled in the art on the basis of the present disclosure belongs to the scope of protection claimed by the disclosure.

What is claimed is:

1. An anti-rollover three-section guide rail, comprising
   an upper rail;
   a middle rail;
   a fixed rail;
   a first roller assembly; and
   a second roller assembly, wherein
   the middle rail is in rolling fit with the fixed rail through the second roller assembly;
   a first rolling slot is concavely formed in the left side wall of the middle rail; and a second rolling slot is concavely formed in the right side wall of the middle rail;
   the first roller assembly comprises a first roller frame;
   the first roller frame is in an inverted U shape and covers the middle rail;
   a first roller is pivoted to the left side of the first roller frame; and the first roller is inserted into and in rolling fit with the first rolling slot;
   a second roller is pivoted to the right side of the first roller frame; and the second roller is inserted into and in rolling fit with the second rolling slot;
   the center of the first roller is located below the center of the second roller;
   the upper rail comprises an inverted U-shaped rail body, and the inverted U-shaped rail body covers the first roller assembly;
   the left side of the inverted U-shaped rail body extends inwards to form a first supporting plate, and the first supporting plate carries the first roller and is in rolling fit with the first roller; and the right side of the inverted U-shaped rail body extends inwards to form a second supporting plate, and
   the second supporting plate carries the second roller and is in rolling fit with the second roller.

2. The anti-rollover three-section guide rail according to claim 1, wherein a third roller is pivoted to the top wall of the first roller frame, and is in rolling fit with the upper rail and the middle rail.

3. The anti-rollover three-section guide rail according to claim 1, wherein
   two first limiting structures which are respectively arranged at the front end and the rear end of the first roller frame are arranged on the middle rail, and the distance between the two first limiting structures is greater than the length of the first roller frame, so that the first limiting structures are used for abutting against the first roller frame.

4. The anti-rollover three-section guide rail according to claim 3, wherein second limiting structures are respectively arranged at the front end and the rear end of the upper rail, and are used for abutting against the first roller frame.

* * * * *